April 13, 1965   C. E. MACFARLANE   3,177,781
PACKING CUP
Filed March 20, 1963
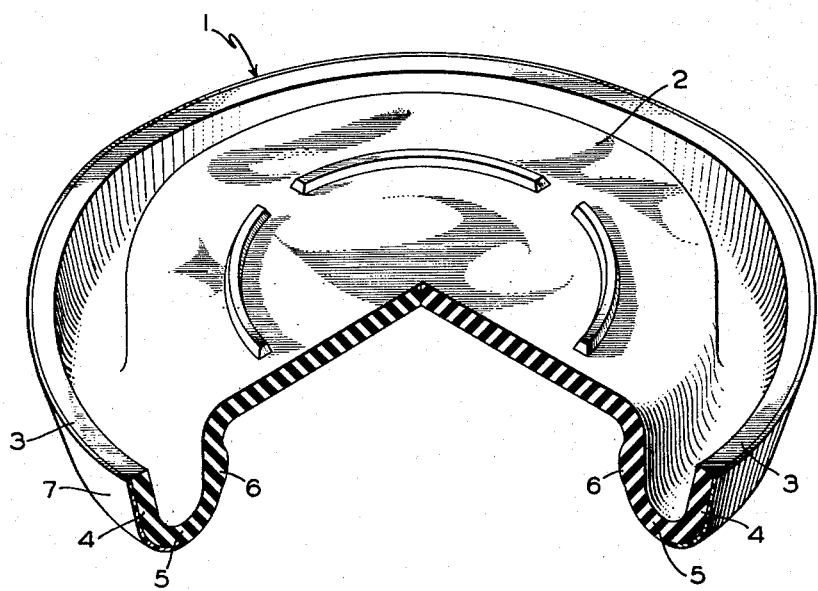
INVENTOR.
Charles E. Macfarlane
BY Joseph Januszkiewicz
Attorney

3,177,781
PACKING CUP
Charles E. Macfarlane, Pittsburgh, Pa., assignor to Westinghouse Air Brake Company, Wilmerding, Pa., a corporation of Pennsylvania
Filed Mar. 20, 1963, Ser. No. 266,677
1 Claim. (Cl. 92—155)

This invention relates to a packing cup and more particularly to a new and improved wear resistant piston packing cup.

Packing cups for pistons used in brake cylinders of fluid pressure brake equipment are either of the annular type provided with relatively large and heavy follower plates adapted for securing the annular packing to the piston or of the one-piece or disc construction type. Both of these constructions presented leakage problems as well as wear problems. In order to assure proper sealing and prolong the life of the packing cup, the outer peripheral portions of the skirts are customarily made thicker to accommodate wear; however, such building up of the peripheral portion limited flexibility and resiliency of the packing cup thereby presenting a problem of proper sealing contact with the cylinder walls upon wear of the skirt material.

It is an object of this invention to provide a piston packing cup which has a wear resistant skirt and at the same time sufficient resiliency in the corrugation to maintain sealing engagement with the walls of the cylinder within which it reciprocates without making such packing cup thicker in dimension.

Accordingly, the piston packing cup comprises a flat central portion and a peripheral skirt portion wherein the outer periphery of the skirt portion has a wear resistant surface made of Teflon.

In the accompanying drawing:

The figure is a perspective view of the packing cup shown with a portion of the packing cup cut away.

Referring to the drawing, the packing cup 1 comprises a central generally flat portion 2 surrounded by a U-shaped corrugated portion that termines into a circumferential edge 3. As viewed in the drawing, the U-shaped corrugation has a skirt or outer annular portion 4, a bight portion 5, and an inner annular portion 6, which inner portion 6 cooperates with the central flat portion 2 for engagement with the face of a piston for retention therewith. In this so-called "snap-on" type of piston packing, a rib on the inner annular peripheral portion 6 cooperates with a groove in a shoulder on the piston to prevent undesired displacement from the piston, thereby assuring a firm engagement with the piston despite the relatively large diameters which such packing cups are designed for.

As will be noted in the drawing, the outermost surface portion of the skirt or annular portion 4 has a wear resistant surface such as a Teflon ring 7. One way of providing a wear resistant surface is by bonding a Teflon ring 7 to the outer peripheral portion of the skirt 4 incidental to the vulcanization of the packing cup. Other methods may be employed to achieve a wear resistant surface to the skirt. As seen in the drawing, the Teflon ring extends from the bight portion 5 to the circumferential edge 3 and circumferentially around the packing cup 1. The Teflon ring 7 abuttingly contacts the cylinder walls of the cylinder in which such packing cup 1 reciprocates.

The outer annular portion 4 is flared outwardly at an angle from the bight portion 5 of the corrugation such that when the packing cup 1 is mounted upon a piston (not shown), the outermost cylindrical surface of the outer annular portion 4 is urged inwardly so that it is substantially parallel with the wall portion of the cylinder with the material in the U-bend portion of the corrugation being then under pressure and tension so that the packing cup is in place within the cylinder and the resiliency of the material within the U-bend portion of the corrugation tends to force the Teflon ring 7 outwardly into firm contact with the cylinder wall.

The material of the piston packing may be a soft synthetic rubber composition which is resistant to the brake cylinder lubricant to be used and which maintains its softness, flexibility and resiliency even at rather low temperatures. Reinforcing fabric embedded in the rubber may be used if desired as an aid in imparting the desired properties to the packing. The Teflon ring 7 or shield has a very remarkable wearing and very low frictional characteristics with even little or no lubrication to thereby prolong the useful life of the packing cup. Such packing cups are particularly useful in high speed rapid transit service wherein pistons and their packing cups frequently operate for long periods of time between inspection periods.

Although the piston packing cup was shown as a snap-on type, it is to be understood that the invention is equally applicable to other types of packing cups.

Obviously, modifications and variations of the present invention are possible in the light of the above teachings. It is therefore to be understood that within the scope of the appended claim, the invention may be practiced otherwise than is specifically described.

Having now described the invention, what I claim as new and desire to secure by Letters Patent, is:

A flexible piston packing cup for use in a cylinder comprising:
(a) a central portion of rubber composition,
(b) said central portion terminating into a U-shaped portion extending circumferentially around said central portion,
(c) said U-shaped portion having an inner circumferentially extending leg portion cooperating with said central portion for engagement with a piston, an outer circumferentially extending leg portion, and a bight portion interconnecting said outer and inner leg portions, and
(d) a ring member circumferentially bonded to the outer surface of said outer leg portion for engagement with the inner wall surface of a cylinder, said ring member comprised of a solid layer of material having low friction and low wear characteristics, said material comprising Teflon.

References Cited by the Examiner
UNITED STATES PATENTS

| | | | |
|---|---|---|---|
| 2,840,426 | 6/58 | Salansky | 92—245 |
| 2,906,552 | 9/59 | White | 277—228 |
| 2,911,270 | 11/59 | White | 92—251 |

KARL J. ALBRECHT, *Acting Primary Examiner.*